United States Patent
Kumar et al.

(10) Patent No.: US 10,844,551 B2
(45) Date of Patent: Nov. 24, 2020

(54) METHOD FOR MANUFACTURING OF PAVER BLOCKS AND BRICKS FROM INDUSTRIAL WASTE

(71) Applicant: Hindustan Zinc Limited, Rajasthan (IN)

(72) Inventors: Ashish Kumar, Udaipur (IN); Kiran Kumar Rokkam, Udaipur (IN); Sheeba Mashruwala, Udaipur (IN); Sundar Saran Sombhatla, Udaipur (IN); Akhilesh Shukla, Udaipur (IN)

(73) Assignee: Hindustan Zinc Limited, Rajasthan (IN)

( * ) Notice: Subject to any disclaimer, the term of this patent is extended or adjusted under 35 U.S.C. 154(b) by 0 days.

(21) Appl. No.: 16/356,838

(22) Filed: Mar. 18, 2019

(65) Prior Publication Data

US 2019/0284768 A1    Sep. 19, 2019

(30) Foreign Application Priority Data

Mar. 17, 2018 (IN) .............................. 201811009823

(51) Int. Cl.
  *E01C 5/00* (2006.01)
  *E01C 5/22* (2006.01)
  *C04B 28/02* (2006.01)
  *C04B 28/14* (2006.01)
  *C04B 111/00* (2006.01)

(52) U.S. Cl.
  CPC ............ *E01C 5/003* (2013.01); *C04B 28/021* (2013.01); *C04B 28/14* (2013.01); *E01C 5/22* (2013.01); *C04B 28/02* (2013.01); *C04B 2111/00017* (2013.01); *C04B 2111/0075* (2013.01)

(58) Field of Classification Search
  CPC . E01C 5/003; E01C 5/22; C04B 28/02; C04B 28/021; C04B 28/14; C04B 2111/00017; C04B 2111/0075
  USPC ................................................. 404/34–46, 72
  See application file for complete search history.

(56) References Cited

U.S. PATENT DOCUMENTS

| | | | | |
|---|---|---|---|---|
| 5,378,279 A * | 1/1995 | Conroy | ............... | C04B 20/0076 106/719 |
| 5,531,823 A * | 7/1996 | Breton | .................... | C04B 28/04 106/713 |
| 5,609,680 A * | 3/1997 | Kobayashi | ............... | B28B 11/04 106/696 |
| 8,419,409 B2 * | 4/2013 | Milot | ........................ | B28B 7/06 425/193 |
| 8,552,092 B2 * | 10/2013 | Xing | .................... | C04B 20/1037 106/713 |
| 2008/0153942 A1 * | 6/2008 | Tejada Juarez | ......... | C04B 26/02 524/5 |
| 2008/0168928 A1 * | 7/2008 | Oh | ........................ | C04B 18/141 106/789 |

(Continued)

*Primary Examiner* — Raymond W Addie
(74) *Attorney, Agent, or Firm* — Kolisch Hartwell, P.C.

(57) ABSTRACT

A method for manufacturing of paver block and bricks includes addition of cementitious materials, additives, and binding materials. The method also includes homogenization of the added materials to obtain a first mixture, addition of a hardener solution to the first mixture, mixing the first mixture with the hardener solution for 5 to 30 minutes to obtain a second mixture, casting the second mixture into a mold to obtain a solidified part, and curing the solidified part in atmospheric air.

19 Claims, 2 Drawing Sheets

(56) References Cited

U.S. PATENT DOCUMENTS

| | | | |
|---|---|---|---|
| 2013/0233206 A1* | 9/2013 | Monte | C04B 26/02 106/671 |
| 2013/0298805 A1* | 11/2013 | Schwartzentruber | C04B 28/04 106/715 |
| 2016/0229162 A1* | 8/2016 | Kafiah | B32B 27/308 |
| 2017/0113971 A1* | 4/2017 | Andersen | C04B 28/02 |
| 2017/0369376 A1* | 12/2017 | Kandhari | C04B 40/0263 |
| 2018/0230056 A1* | 8/2018 | Chiaverini | C04B 24/38 |

* cited by examiner

METHOD FOR MANUFACTURING OF PAVER BLOCKS AND BRICKS FROM INDUSTRIAL WASTE

TECHNICAL FIELD

The present invention relates to the technical field of building materials, and in particular, provides a method for manufacturing of paver block and bricks from industrial waste.

INTRODUCTION

Chemical industries perform hydrometallurgical and pyro metallurgical processes on a continuous basis for obtaining metals from their ores. Typically, lead and zinc concentrate are processed through hydrometallurgical and pyro metallurgical process. This results in generation of iron wastes such as Jarosite and lead-zinc slags from the respective processes. In addition, the Coal based power plants (CPP) generates fly ash as their waste. Part of this material is sold at very marginal realization while rest is stored in yards or in secured landfills. Further, various waste and residues are generated during extraction of Zn metal from its concentrates. At various stages of processing, the composition and physical properties of waste changes which provides a wide array of residues. Some of the wastes/residues that are of some economic value are used as secondary's within processing plants or sold off. In addition, large amount of waste with very low metals values are generated that cannot be used anywhere and thus dumped in secured landfills. Therefore, there is need for the proper utilization of the industrial waste generated by various industries.

SUMMARY

In a first example, the present disclosure provides a method for manufacturing of paver block and bricks from industrial waste residue. The method includes a first step of addition of a first pre-defined quantity of cementitious materials in one or more mixers. In addition, the method includes a second step of addition of a second pre-defined quantity of conventional aggregates in each of the one or more mixers. Further, the method includes a third step of addition of a third pre-defined quantity of additives in each of the one or more mixers. The additives include Jarosite, slag and mine tailings. Furthermore, the method includes a fourth step of addition of a fourth pre-defined quantity of binding materials in each of the one or more mixers. Moreover, the method includes a fifth step of homogenizing the cementitious material, the conventional aggregates, the additives and the binding materials to obtain a first mixture. Also, the method includes a sixth step of addition of a fifth pre-defined quantity of hardener solution to the first mixture in each of the one or more mixers. Also, the method includes a seventh step of mixing the first mixture with the hardener solution for a pre-defined time interval of 5 minute to 30 minute to obtain a second mixture. Also, the method includes an eighth step of casting the second mixture into a mould for making paver block and bricks to obtain a solidified part. Also, the method includes a ninth step of curing the solidified part for about 5 to 28 days in atmospheric air. Homogenizing is done in each of the one or more mixers. Mixing is done in each of the one or more mixers. Water is sprinkled for minimum 1 to 14 days during the curing process.

In an embodiment of the present disclosure, the casting is performed by vibration in a machine or manually.

In an embodiment of the present disclosure, the casting is performed by compaction in a machine or manually.

In an embodiment of the present disclosure, the cementitious materials used for manufacturing paver block and bricks include fly ash and bottom ash.

In an embodiment of the present disclosure, the conventional aggregates used for manufacturing paver block and bricks include stone dust and grit.

In an embodiment of the present disclosure, the binding material used for manufacturing paver block includes cement and gypsum.

In an embodiment of the present disclosure, the first pre-defined quantity of cementitious materials is added in a range of about 0% to 50% by weight.

In an embodiment of the present disclosure, the third pre-defined quantity of additives is added in a range of about 0% to 80% by weight.

In an embodiment of the present disclosure, the fourth pre-defined quantity of binding materials is added in a range of about 1% to 15% by weight.

In an embodiment of the present disclosure, the fifth pre-defined quantity of hardener solution is added in a range of about 0.5% to 5% by weight.

In an embodiment of the present disclosure, the second pre-defined quantity of conventional aggregates is added based on compressive strength and size desired for the paver block and bricks.

In an embodiment of the present disclosure, the additives correspond to the industrial waste residue obtained from pyrometallurgical process of lead and zinc and hydrometallurgical process of zinc.

In a second example, the present disclosure provides a method for manufacturing of paver block and bricks from industrial waste. The method includes a first step of addition of a first pre-defined quantity of cementitious materials in one or more mixers. The first pre-defined quantity of cementitious materials is added in a range of about 0% to 50% by weight. In addition, the method includes a second step of addition of a second pre-defined quantity of conventional aggregates in each of the one or more mixers. Further, the method includes a third step of addition of a third pre-defined quantity of additives in each of the one or more mixers. The additives include Jarosite, slag and mine tailings. The third pre-defined quantity of additives is added in a range of about 0% to 80% by weight. Furthermore, the method includes a fourth step of addition of a fourth pre-defined quantity of binding materials in each of the one or more mixers. The fourth pre-defined quantity of binding materials is added in a range of about 1% to 15% by weight. Moreover, the method includes a fifth step of homogenizing the cementitious material, the conventional aggregates, the additives and the binding materials to obtain a first mixture. Also, the method includes a sixth step of addition of a fifth pre-defined quantity of hardener solution to the first mixture in each of the one or more mixers. The fifth pre-defined quantity of hardener solution is added in a range of about 0.5% to 5% by weight. Also, the method includes a seventh step of mixing the first mixture with the hardener solution for a pre-defined time interval of 5 minute to 30 minute to obtain a second mixture. Also, the method includes an eighth step of casting the second mixture into a mould for making paver block and bricks to obtain a solidified part. Also, the method includes a ninth step of curing the solidified part for about 5 to 28 days in atmospheric air. Homogenizing is done in each of the one or more mixers. Mixing is done in each of the one or more mixers. Water is sprinkled for minimum 1 to 14 days during the curing process.

In an embodiment of the present disclosure, the casting is performed by vibration in a machine or manually.

In an embodiment of the present disclosure, the casting is performed by compaction in a machine or manually.

In an embodiment of the present disclosure, the cementitious materials used for manufacturing paver block and bricks include fly ash and bottom ash.

In an embodiment of the present disclosure, the conventional aggregates used for manufacturing paver block and bricks include stone dust and grit.

In an embodiment of the present disclosure, the binding material used for manufacturing paver block includes cement and gypsum.

In an embodiment of the present disclosure, the second pre-defined quantity of conventional aggregates is added based on compressive strength and size desired for the paver block and bricks.

In an embodiment of the present disclosure, the additives correspond to the industrial waste residue obtained from pyrometallurgical process of lead and zinc and hydrometallurgical process of zinc.

In a third example, a composition for making paver block and bricks is provided. The composition includes 0 to 50% by weight of cementitious materials, 0 to 80% by weight of additives comprising Jarosite, slag and mine tailings, 1 to 15% by weight of binding material, balanced amount of conventional aggregates and 0.5% to 5% by weight of hardener solution.

BRIEF DESCRIPTION OF THE DRAWINGS

Figure 1A:
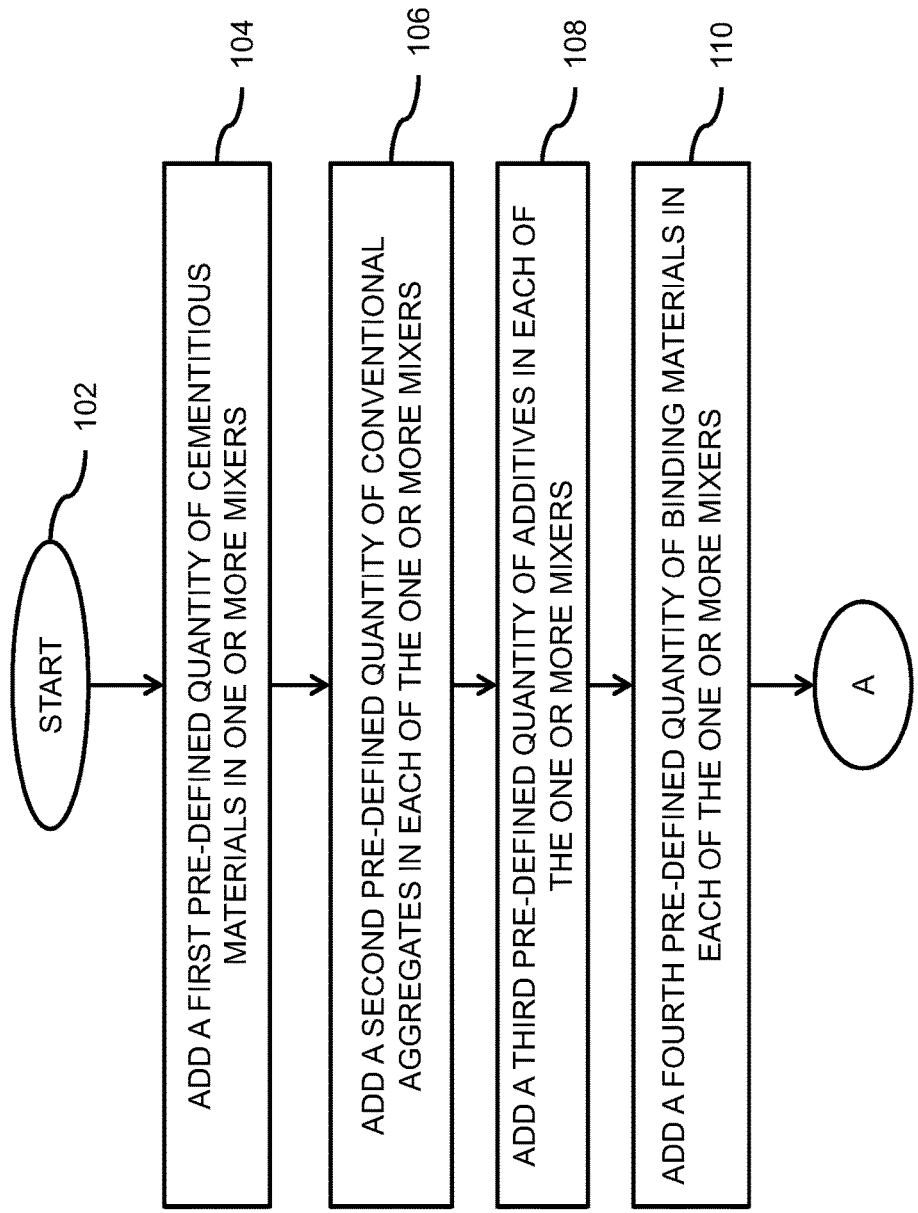
Figure 1B:
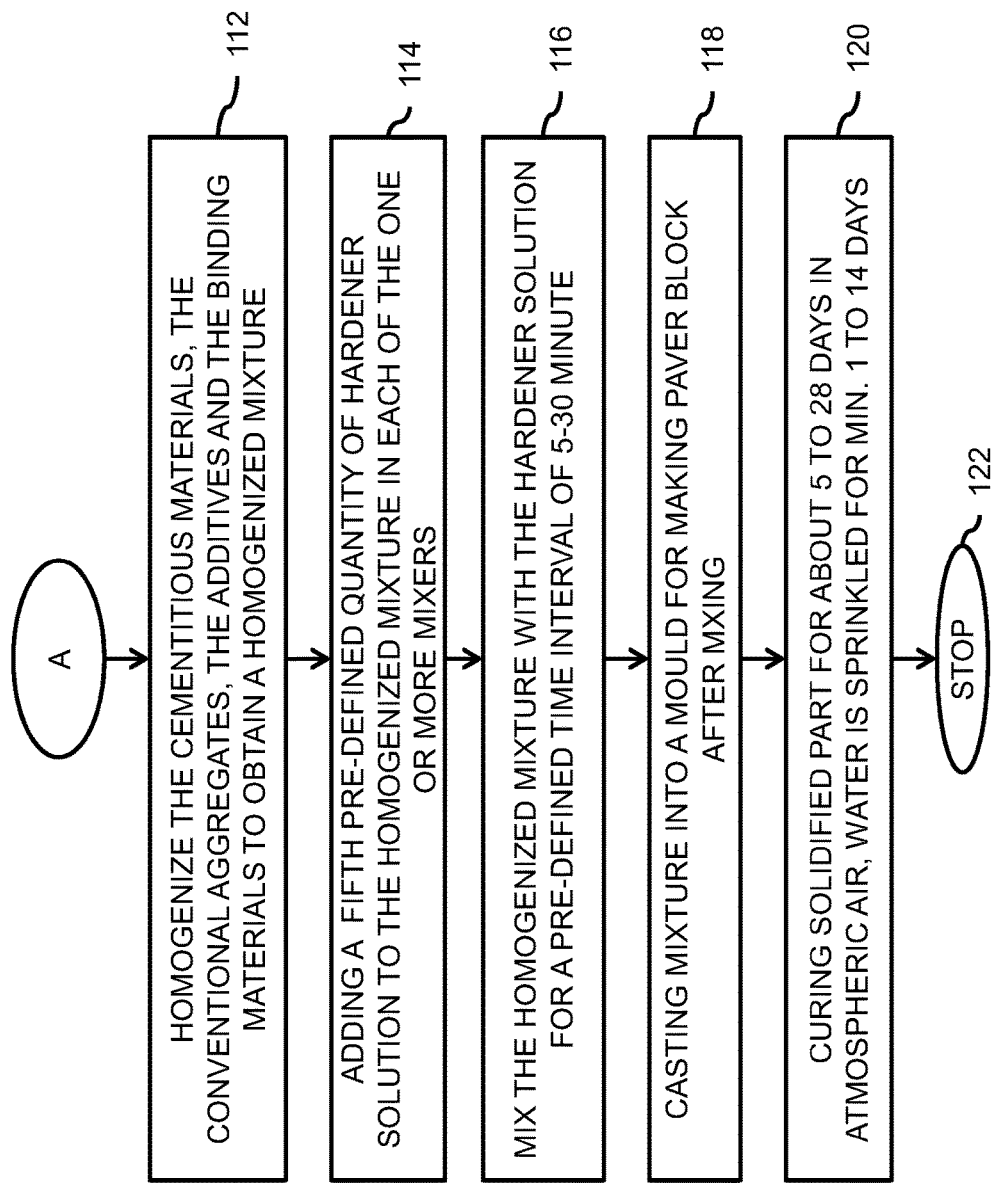

Having thus described the invention in general terms, reference will now be made to the accompanying drawings, which are not necessarily drawn to scale, and wherein:

FIG. 1A and FIG. 1B illustrate a flow chart for manufacturing of paver block from industrial waste, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1A and FIG. 1B illustrate a flowchart 100 for a method for manufacturing of paver block and bricks from industrial waste residue, in accordance with various embodiments of the present disclosure. The flowchart 100 starts at step 102 as shown in FIG. 1A. The flowchart 100 illustrates a step by step method for the manufacturing of the paver blocks and bricks. It may be noted that the flowchart 100 may have lesser or more number of steps. In general, the paver block is a paving stone, tile, brick or brick-like piece of concrete commonly used as exterior flooring. The paver block is used in the construction of footpath on both side of road. The paver block is manufactured of different shape and size based on the requirement. The paver block is used in various places and industry based on the requirement of the physical property of the paver block. The bricks are concrete bars used in the construction industry for construction of building, house and the like. In an embodiment of the present disclosure, the bricks are manufactured based on the requirement. In an example, if a skyscraper is being built than it is necessary that the bricks should be light weight and the shape of the bricks should cover a larger volume.

The industrial waste residue includes the residue which is left after a particular process has been performed in an industry. The industrial waste produced is used in the manufacturing of the paver block and bricks such that the industrial waste can be utilized and the same physical property can be achieved which is present in the paver block and bricks manufactured from conventional methods.

The paver block is manufactured according to a method. The method includes a set of steps. The set of steps include a first step 104 of addition of a first pre-defined quantity of cementitious materials in one or more mixers as mentioned 104 in the flowchart 100 in FIG. 1A. The first pre-defined quantity of cementitious materials is taken in a range of 0% to 50% by weight. In an embodiment of the present disclosure, the range of the first pre-defined quantity of cementitious materials may vary based on the compressive strength which needs to be attained by the paver block and bricks. In general, the cementitious materials are those materials which hold the concrete together. The cementitious materials include fly ash and bottom ash. In an embodiment of the present disclosure, the cementitious materials include any material which can hold the concrete together. In addition, fly ash and bottom ash are obtained from the coal based power plants which generate fly ash and bottom ash as their waste. In an embodiment of the present disclosure, the fly ash and bottom ash can be obtained from any other industry which creates fly ash as a waste product of a process which is being performed in that industry.

The one or more mixers are mixtures used for mixing ingredients together with each other in order to get same proportions of its components throughout the mixture. The one or more mixers are mechanical mixers. In an embodiment of the present disclosure, the one or more mixers are manual mixers.

The set of steps further include a second step of addition of a second pre-defined quantity of conventional aggregates in each of the one or more mixers as mentioned in step 106 of the flowchart 100 in FIG. 1A. The second pre-defined quantity of conventional aggregates is added based on the compressive strength and size which needs to be achieved by the paver block and bricks. The weight of the conventional aggregates should be balanced for the manufacturing of the paver block and bricks. The conventional aggregates include stone dust and grit. In an embodiment of the present disclosure, the conventional aggregates include sand, gravel, crushed stone, slag, recycled concrete, geosynthetic aggregates and the like. In general, the grit is a small loose particle of stone or sand. The grit is considered as an industrial waste which may be used for the manufacturing of paver block and bricks. In general, the stone dust is a byproduct of crushing stone.

The set of steps further include a third step of addition of a third pre-defined quantity of additives in each of the one or more mixers as mentioned in step 108 of the flowchart 100 in FIG. 1A. The third pre-defined quantity of additives is taken in a range of 0% to 80% by weight. In an embodiment of the present disclosure, the range of the third pre-defined quantity of additives may vary based on the properties which need to be attained by the paver block and bricks. In general, the additives are also called as admixtures. The additives are those chemical compounds that are used to modify certain properties of the paver block and bricks. The additives include slag, Jarosite and mine tailing. In an embodiment of the present disclosure, the additives may be any other chemical compound which is to be added for the manufacturing of paver block and bricks in order to attain desired properties of the paver block and bricks. The slag used for the manufacturing of paver block and bricks are Iron waste produced during Lead and Zinc (Zn/Pb) pyro metallurgical operation though vertical, horizontal furnaces. In general, the pyro metallurgical operation is the process of thermal treatment of minerals and metallurgical ores and concentrates to bring about physical and chemical transformations in the materials to enable recovery of valuable metals. Jarosite used for the manufacturing of paver block and bricks are the Iron residue which consists of sulphate, hydroxyl ion and silicates. Jarosite is generated during hydrometallurgical processing of Zn concentrates. In an embodiment of the present disclosure, the Jarosite is obtained from ores, deposits, byproduct in a chemical plant, residue or waste of a chemical plant and the like. The mine tailing used of the manufacturing of paver block and bricks are the industrial waste which is generated during ore beneficiation process.

The set of steps further include a fourth step of addition of a fourth pre-defined quantity of binding materials in each of the one or more mixers as mentioned in step 110 of the flowchart 100 in FIG. 1A. The fourth pre-defined quantity of binding materials is taken in the range of 1% to 15% by weight. In an embodiment of the present disclosure, the range of the fourth pre-defined quantity of additives may vary based on the properties which need to be attained by the paver block and bricks. In general, the binding materials are any material which holds the other material together to enable bonding between the materials. The binding materials provide setting and hardening speeds to the paver block and bricks. The binding materials include cement and gypsum. In an embodiment of the present disclosure, the binding materials may be any other material based on the requirements of the properties which need to be attained by the paver block and bricks. In general, the cement is a binder which is used for construction that sets, hardens and adheres to others materials, binding them together. The cement is used as a binder for the manufacturing of the paver block and bricks such that the desired properties of the paver block and bricks may be achieved based on the requirements. In general, gypsum is a soft sulfate mineral which is mined and is used for providing the setting and hardening speed to the paver block and bricks.

The set of steps further includes a fifth step of homogenizing the cementitious materials, the conventional aggregates, the additives and the binding materials in each of the one or more mixers to obtain a first mixture as mentioned in step 112 of the flowchart 100 in FIG. 1B. The first mixture is a homogeneous mixture. Homogenization is the process where all the materials are mixed together to form a homogenous mixture which has the same proportions of its components throughout the admixtures. Homogenization is done in each of the one or more mixers manually or by the mechanical mixer. In an embodiment of the present disclosure, the homogenization is performed till all the materials are mixed to form a homogeneous mixture.

The set of steps further includes a sixth step of addition of a fifth pre-defined quantity of hardener solution to the first mixture in each of the one or more mixers as mentioned in step 114 of the flowchart 100 in FIG. 1B. The fifth pre-defined quantity of hardener solution is taken in the range of 0.5% to 5% by weight. In an embodiment of the present disclosure, the range of the fifth pre-defined quantity of additives may vary based on the properties which need to be attained by the paver block and bricks. The hardener solution is a retarding super plasticizing admixture for developing concrete. The hardener solution is having slump retaining properties for the manufacturing of paver block and bricks. The hardener solution is prepared by using synthetic polymer, a sulphonated naphthalene polymer based formulation. In an embodiment of the present disclosure, the hardener solution is prepared by using material which can provide slump retaining properties to the hardener.

The set of steps further includes a seventh step of mixing the first mixture obtained in step 112 with the hardener solution for a pre-defined time interval in each of the one or more mixers to obtain a second mixture. The second mixture is a homogeneous mixture. The mixing of the homogenized material with the hardener solution is mentioned in step 116 of the flowchart 100 in FIG. 1B. The pre-defined time interval is in a range of about 5 minute to 30 minutes. In an embodiment of the present disclosure, the pre-defined time interval depends on the time required by the materials to mix with each other. The mixing is done in order to mix all the ingredients together to form the second mixture which has the same proportions of its components throughout the mixture. Mixing is done in each of the one or more mixers manually or by the mechanical mixer.

The set of steps further includes an eighth step of casting the mixture obtained in step 116 after mixing the homogenized material with the hardener solution. The casting of the mixture is as mentioned in step 118 of the flowchart 100 in FIG. 1B. The casting is performed on the mixture by pouring the mixture obtained from step 116 into a mould for making the paver block and bricks. In general, the mould is a hollow container used to give shape to molten material when it cools and hardens. The mould used for making the paver block and bricks depends on the requirement, shape and size of the paver block and bricks. In an embodiment of the present disclosure, mould of different shape and size are required based on the requirements. The mould is made of any material which includes but may not be limited to wood, metal, plastic. The casting is performed by vibration in a machine or manually. In an embodiment of the present disclosure, the casting is performed by compaction in a machine or manually. In another embodiment of the present disclosure, the casting is performed by any other process which provide the desired shape and size such the mixture is divided equally in the mould. After the casting has been performed on the mixture, a solidified part is obtained which is further processed for getting the paver block and the bricks with the desired properties.

The set of steps further includes a ninth step of curing the solidified part obtained in step 118. The curing is the process during which the solidified part is left out by exposing the paver block and bricks in atmospheric air as mentioned in step 120 of the flowchart in FIG. 1B. The curing is performed for about 5 to 28 days and water is sprinkled for minimum 1 to 14 days in order to prevent the concrete from drying such that the desired properties can be achieved. The water is sprinkled on the solidified part during curing in order to achieve the desired result by the paver block and bricks. In an embodiment of the present disclosure, the curing time is based on the requirement of the paver block and bricks property which needs to be attained. After the completion of the curing, the mould is removed and the paver block and bricks of desired compressive strength and size are received. The method terminates at step 122 as shown in FIG. 1B.

In an example, the binding material used for the manufacturing of the paver block and bricks is 3% by weight. The cementitious material used for the manufacturing of the paver block and bricks is 21% by weight. The conventional aggregate used for the manufacturing of the paver block and bricks is 0% by weight. The additive used for the manufacturing of the paver block and bricks is 76% by weight. The results provides that the compressive strength achieved by the paver block and bricks after 28 days curing is about 6.5 MPa and the aggregates size is about 2-10 mm.

In another example, the binding material used for the manufacturing of the paver block and bricks is 7% by weight. The cementitious material used for the manufacturing of the paver block and bricks is 20% by weight. The conventional aggregate used for the manufacturing of the paver block and bricks is 10% by weight. The additive used for the manufacturing of the paver block and bricks is 63% by weight. The results provides that the compressive strength achieved by the paver block and bricks after 28 days curing is about 25 MPa and the aggregates size is about 2-10 mm.

In yet another example, the binding material used for the manufacturing of the paver block and bricks is 10% by weight. The cementitious material used for the manufacturing of the paver block and bricks is 14% by weight. The conventional aggregate used for the manufacturing of the paver block and bricks is 35% by weight. The additive used for the manufacturing of the paver block and bricks is 41% by weight. The results provides that the compressive strength achieved by the paver block and bricks after 28 days curing is about 40 MPa and the aggregates size is about 2-10 mm.

In yet another example, the binding material used for the manufacturing of the paver block and bricks is 11% by weight. The cementitious material used for the manufacturing of the paver block and bricks is 5% by weight. The conventional aggregate used for the manufacturing of the paver block and bricks is 54% by weight. The additive used for the manufacturing of the paver block and bricks is 30% by weight. The results provides that the compressive strength achieved by the paver block and bricks after 28 days curing is about 60 MPa and the aggregates size is about 2-20 mm.

The present disclosure enables partial or complete replacement of conventional raw materials for the manufacturing of paver block and bricks. In addition, the method disclosed enables manufacturing of paver block and bricks of different compressive strength depending on its usage in the pavements. Moreover, the method disclosed avoids dumping of waste materials in environment and enables utilization of industrial waste materials for manufacturing paver blocks. The utilization of industrial waste helps reduce land pollution.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A method for manufacturing of paver block and bricks from industrial waste residue, the method comprising:
adding a first pre-defined quantity of cementitious materials in one or more mixers;
adding a second pre-defined quantity of conventional aggregates in each of the one or more mixers;
adding a third pre-defined quantity of additives in each of the one or more mixers, wherein the additives comprising Jarosite, slag and mine tailings;
adding a fourth pre-defined quantity of binding materials in each of the one or more mixers;
homogenizing the cementitious material, the conventional aggregates, the additives and the binding materials to obtain a first mixture, wherein the homogenizing is done in each of the one or more mixers;
adding a fifth pre-defined quantity of hardener solution to the first mixture in each of the one or more mixers, wherein the fifth pre-defined quantity of the hardener solution is added in a range of about 0.5% to 5% by weight;

mixing the first mixture with the hardener solution for a pre-defined time interval of 5 minute to 30 minute to obtain a second mixture, wherein the mixing is done in each of the one or more mixers;

casting the second mixture into a mould to obtain a solidified part; and curing the solidified part for about 5 to 28 days in atmospheric air to obtain the paver block and bricks, wherein water is sprinkled for a minimum of 1 to 14 days on the solidified part during the curing.

2. The method as recited in claim 1, wherein the casting is performed by vibration in a machine or manually.

3. The method as recited in claim 1, wherein the casting is performed by compaction in a machine or manually.

4. The method as recited in claim 1, wherein the cementitious materials used for the manufacturing of the paver block and bricks comprising fly ash and bottom ash.

5. The method as recited in claim 1, wherein the conventional aggregates used for the manufacturing of the paver block and bricks comprising stone dust and grit.

6. The method as recited in claim 1, wherein the binding materials used for the manufacturing of the paver block and bricks comprising cement and gypsum.

7. The method as recited in claim 1, wherein the hardener solution used for the manufacturing of the paver block and bricks comprising a synthetic polymer and a sulphonated naphthalene polymer.

8. The method as recited in claim 1, wherein the first pre-defined quantity of cementitious materials is added in a range of about 0% to 50% by weight.

9. The method as recited in claim 1, wherein the second pre-defined quantity of conventional aggregates is added based on compressive strength and size desired for the paver block and bricks.

10. The method as recited in claim 1, wherein the third pre-defined quantity of additives is added in a range of about 0% to 80% by weight.

11. The method as recited in claim 1, wherein the fourth pre-defined quantity of binding materials is added in a range of about 1% to 15% by weight.

12. The method as recited in claim 1, wherein the additives correspond to the industrial waste residue obtained from pyrometallurgical process of lead and zinc and hydrometallurgical process of zinc.

13. A method for manufacturing of paver block and bricks from industrial waste residue, the method comprising:

adding a first pre-defined quantity of cementitious materials in one or more mixers, wherein the first pre-defined quantity of cementitious materials is added in a range of about 0% to 50% by weight;

adding a second pre-defined quantity of conventional aggregates in each of the one or more mixers;

adding a third pre-defined quantity of additives in each of the one or more mixers, wherein the additives comprising Jarosite, slag and mine tailings and wherein the third pre-defined quantity of additives is added in a range of about 0% to 80% by weight;

adding a fourth pre-defined quantity of binding materials in each of the one or more mixers, wherein the fourth pre-defined quantity of binding materials is added in a range of about 1% to 15% by weight;

homogenizing the cementitious material, the conventional aggregates, the additives and the binding materials to obtain a first mixture, wherein the homogenizing is done in each of the one or more mixers;

adding a fifth pre-defined quantity of hardener solution to the first mixture in each of the one or more mixers, wherein the fifth pre-defined quantity of hardener solution is added in a range of about 0.5% to 5% by weight;

mixing the first mixture with the hardener solution for a pre-defined time interval of 5 minute to 30 minute to obtain a second mixture, wherein the mixing is done in each of the one or more mixers;

casting the second mixture into a mould to obtain a solidified part; and curing the solidified part for about 5 to 28 days in atmospheric air to obtain the paver block and bricks, wherein water is sprinkled for a minimum of 1 to 14 days on the solidified part during the curing process.

14. The method as recited in claim 13, wherein the casting is performed by vibration in a machine or manually.

15. The method as recited in claim 13, wherein the casting is performed by compaction in a machine or manually.

16. The method as recited in claim 13, wherein the conventional aggregates used for the manufacturing of the paver block and bricks comprising stone dust and grit.

17. The method as recited in claim 13, wherein the binding materials used for the manufacturing of the paver block and bricks comprising cement and gypsum.

18. The method as recited in claim 13, wherein the hardener solution used for the manufacturing of the paver block and bricks comprising a synthetic polymer and a sulphonated naphthalene polymer.

19. A composition for making paver block and bricks, the composition comprising:

cementitious materials in a range of about 0 to 50% by weight;

additives comprising Jarosite, slag and mine tailings in a range of about 0 to 80% by weight;

binding material in a range of about 1 to 15% by weight;

a balanced amount of conventional aggregates; and 0.5 to 5% by weight of hardener solution.

* * * * *